(12) United States Patent
Muhl et al.

(10) Patent No.: US 7,134,159 B2
(45) Date of Patent: Nov. 14, 2006

(54) STUMP-OUT APPARATUS FOR A DOCK LEVELER

(75) Inventors: Timothy Muhl, Slinger, WI (US); Matthew Tourdot, Whitewater, WI (US); Reinhard Sander, Wauwatosa, WI (US); Norbert Hahn, Franklin, WI (US); Matthew C. McNeill, White Fish Bay, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 10/756,613

(22) Filed: Jan. 13, 2004

(65) Prior Publication Data

US 2005/0150065 A1  Jul. 14, 2005

(51) Int. Cl.
*E01D 1/00* (2006.01)
(52) U.S. Cl. .......................... 14/71.3; 14/71.1
(58) Field of Classification Search .............. 14/71.1, 14/71.3, 71.7
See application file for complete search history.

(56) References Cited

U.S. PATENT DOCUMENTS

| 2,881,458 | A | 4/1959 | Rodgers |
| 2,974,336 | A | 3/1961 | Kelly |

(Continued)

FOREIGN PATENT DOCUMENTS

| CA | 657714 | 2/1963 |

(Continued)

OTHER PUBLICATIONS

*Written Opinion of the International Searching Authority*, International Bureau, Mar. 29, 2005, 6 sheets.

(Continued)

*Primary Examiner*—Gary S. Hartmann
(74) *Attorney, Agent, or Firm*—Hanley, Flight & Zimmerman LLC (57) ABSTRACT

A closed loop reciprocating fluid circuit apparatus for mechanically powered and electromechanically powered dock levelers, which may be mounted at a forward edge of a dock leveler to selectively engage the dock leveler during pivotal downward movement of a deck, is provided. The apparatus may include a header extending from a fluid chamber (e.g., a hydraulic cylinder), where the header may selectively engage the deck, within the range of dock leveler heights, including below dock level and above dock level operating positions. The hydraulic cylinder may be vertically oriented and coupled to a fluid accumulation chamber, such that vertical movement of the header in response to the deck's downward movement causes fluid displacement into the accumulation chamber. That displacement may be in a horizontally oriented fluid chamber having a piston that reacts to the fluid transfer. Alternatively, that displacement may be into a resilient fluid chamber such as a bladder housed within a suitable container, or a fluid chamber such as a fluid reservoir with a breather, for air volume compensation. The hydraulic cylinder and header may be urged to the extended position, for example by extension springs acting on a piston within the fluid accumulation chamber, or by a pull chain or latch coupled to the cylinder and the upward movement of the deck. A flow control valve, e.g., a velocity fuse or solenoid valve, is connected between the cylinder and the fluid accumulation chamber to respond to free fall of the deck. Resetting to normal operation after free fall detection may occur after load removal from the deck and by movement of the cylinder to the opposite direction or by electrical control input to the control valve.

26 Claims, 10 Drawing Sheets

U.S. PATENT DOCUMENTS

| | | |
|---|---|---|
| 3,061,855 A | 11/1962 | Layne |
| 3,081,470 A | 3/1963 | Feeley |
| 3,087,178 A | 4/1963 | Loomis |
| 3,117,332 A | 1/1964 | Kelly et al. |
| 3,137,017 A | 6/1964 | Pfleger et al. |
| 3,138,812 A | 6/1964 | Prosser |
| 3,175,238 A | 3/1965 | Pennington |
| 3,199,133 A | 8/1965 | Ramer |
| 3,235,896 A | 2/1966 | Riggs |
| 3,249,956 A | 5/1966 | Zajac et al. |
| 3,271,801 A | 9/1966 | Dieter |
| 3,280,414 A | 10/1966 | Layne |
| 3,299,456 A | 1/1967 | Dieter |
| 3,308,497 A | 3/1967 | Lambert |
| 3,317,004 A | 5/1967 | Harrison, Jr. |
| 3,323,158 A | 6/1967 | Loomis |
| 3,327,335 A | 6/1967 | Beckwith et al. |
| 3,368,229 A | 2/1968 | Pfleger |
| 3,409,922 A | 11/1968 | Beckwith et al. |
| 3,411,168 A | 11/1968 | Heckler, Jr. |
| 3,426,377 A | 2/1969 | Beckwith et al. |
| 3,444,574 A | 5/1969 | LeClear |
| 3,460,175 A | 8/1969 | Beckwith et al. |
| 3,475,778 A | 11/1969 | Merrick et al. |
| 3,486,181 A | 12/1969 | Heckler, Jr. et al. |
| 3,497,893 A | 3/1970 | Beckwith et al. |
| 3,500,485 A | 3/1970 | Le Clear |
| 3,516,103 A | 6/1970 | Heckler, Jr. et al. |
| 3,530,488 A | 9/1970 | Beckwith |
| 3,553,756 A | 1/1971 | Heckler, Jr. et al. |
| 3,579,696 A | 5/1971 | Heckler, Jr. et al. |
| 3,583,014 A | 6/1971 | Brown et al. |
| 3,662,416 A | 5/1972 | Brooks et al. |
| 3,671,990 A | 6/1972 | Hovestad |
| 3,685,076 A | 8/1972 | Loblick |
| 3,699,601 A | 10/1972 | Heckler, Jr. et al. |
| 3,728,753 A | 4/1973 | Beckwith et al. |
| 3,763,514 A | 10/1973 | Bishop |
| 3,786,530 A | 1/1974 | Le Clear |
| 3,835,497 A | 9/1974 | Smith |
| 3,858,264 A | 1/1975 | Kuhns et al. |
| 3,877,102 A | 4/1975 | Artzberger |
| 3,902,213 A | 9/1975 | Pfleger et al. |
| 3,913,901 A | 10/1975 | Molders |
| 3,921,241 A | 11/1975 | Smith |
| 3,967,337 A | 7/1976 | Artzberger |
| 3,991,863 A | 11/1976 | Lee |
| 3,995,342 A | 12/1976 | Wiener |
| 4,010,505 A | 3/1977 | Bouman |
| 4,065,824 A | 1/1978 | Ellis et al. |
| 4,068,338 A | 1/1978 | Artzberger |
| 4,110,860 A | 9/1978 | Neff et al. |
| RE301,049 | 10/1979 | Burnham |
| 4,257,137 A | 3/1981 | Hipp et al. |
| 4,279,050 A | 7/1981 | Abbott |
| 4,325,155 A | 4/1982 | Alten |
| 4,328,602 A | 5/1982 | Bennett |
| 4,364,137 A | 12/1982 | Hahn |
| 4,402,100 A | 9/1983 | Slusar |
| 4,476,052 A * | 10/1984 | Hunger et al. ............... 534/575 |
| 4,531,247 A | 7/1985 | Eary, Sr. |
| 4,570,277 A | 2/1986 | Hahn et al. |
| 4,619,008 A | 10/1986 | Kovach et al. |
| 4,641,388 A * | 2/1987 | Bennett et al. ............... 14/71.7 |
| 4,662,021 A | 5/1987 | Hagen et al. |
| 4,744,121 A | 5/1988 | Swessel et al. |
| 4,776,052 A | 10/1988 | Delgado et al. |
| 4,819,770 A | 4/1989 | Hahn |
| 4,823,421 A * | 4/1989 | Kleynjans et al. ........... 14/71.3 |
| 4,865,507 A | 9/1989 | Trickle |
| 4,920,598 A | 5/1990 | Hahn |
| 4,922,568 A * | 5/1990 | Hageman ..................... 14/71.3 |
| 4,937,906 A | 7/1990 | Alexander |
| 4,944,062 A | 7/1990 | Walker |
| 4,974,276 A | 12/1990 | Alexander |
| 4,979,253 A | 12/1990 | Alexander |
| 4,995,130 A | 2/1991 | Hahn et al. |
| 5,040,258 A | 8/1991 | Hahn et al. |
| 5,088,143 A | 2/1992 | Alexander |
| 5,123,135 A | 6/1992 | Cook et al. |
| 5,205,010 A * | 4/1993 | Hageman ..................... 14/71.7 |
| 5,311,628 A | 5/1994 | Springer et al. |
| 5,323,503 A | 6/1994 | Springer |
| 5,392,481 A * | 2/1995 | Hageman ..................... 14/71.1 |
| 5,416,941 A | 5/1995 | Hageman |
| 5,440,772 A | 8/1995 | Springer et al. |
| 5,457,838 A | 10/1995 | Gelder et al. |
| 5,475,888 A | 12/1995 | Massey |
| 5,526,545 A | 6/1996 | Alexander |
| 5,553,343 A | 9/1996 | Alexander |
| 5,560,063 A | 10/1996 | Alten et al. |
| 5,586,356 A | 12/1996 | Alexander |
| 5,640,733 A | 6/1997 | Alten et al. |
| 5,784,740 A | 7/1998 | DiSieno et al. |
| 5,813,072 A | 9/1998 | Alexander |
| 6,065,172 A | 5/2000 | Swessel |
| 6,085,375 A | 7/2000 | Holm |
| 6,216,303 B1 | 4/2001 | Massey |
| 6,276,016 B1 | 8/2001 | Springer |
| 6,327,733 B1 * | 12/2001 | Alexander et al. ........... 14/71.7 |
| 6,487,741 B1 | 12/2002 | Alexander |

FOREIGN PATENT DOCUMENTS

| | | |
|---|---|---|
| CA | 0935606 | 10/1973 |
| DE | 2706109 A1 | 8/1978 |
| DE | 28 00 128 | 7/1979 |
| DE | 29 52 658 A1 | 7/1981 |
| EP | 0130393 | 1/1985 |
| FR | 2615177 | 11/1988 |
| GB | 1349801 | 4/1974 |
| GB | 2048210 | 12/1980 |
| GB | 2 094 751 A | 9/1982 |
| GB | 2 144 706 A | 3/1985 |

OTHER PUBLICATIONS

*International Search Report*, International Bureau, Mar. 29, 2005, 4 sheets.

\* cited by examiner

STUMP-OUT APPARATUS FOR A DOCK LEVELER

FIELD OF THE INVENTION

The disclosure is directed generally to dock levelers and, more particularly, to dock levelers with enhanced free fall protection.

BACKGROUND OF THE INVENTION

Dock levelers are commonly used at loading docks to bridge the gap between a parked vehicle and the loading dock. An approaching vehicle comes to rest near the loading dock, but with some open space between the vehicle's cargo bed and the loading dock's edge. The dock leveler is able to engage the vehicle's bed to provide a continuous driving surface to the dock and thereby facilitate loading and unloading. Given the size and weight of fork-lifts, this driving surface should be smooth and able to support substantial weight.

Dock levelers typically include a frame formed within the pit of a loading dock and a deck pivotally attached to an end of that frame. The deck is movable from a "stored" position, also known as a dock level position, wherein the deck is even with the warehouse or building floor, and a range of operating positions both above and below this position. The range of operating positions is useful to engage vehicles of different bed heights. The range is also useful to maintain engagement with the bed as its height fluctuates with the reaction of the vehicle's suspension during loading and unloading.

At the front end of the deck is a lip pivotally connected to the front end of the deck for movement between a pendant, or stored, position and an extended position. In the extended position, the lip may bridge the gap between the deck and the bed of the parked vehicle to form a continuous driving surface. Typically, in this configuration, the engagement between the vehicle bed and the lip is the only thing supporting the deck against falling.

During engagement, the lip and deck are able to ride with the vehicle bed as that bed floats, for example, as different downward forces are exerted on the vehicle's bed and the vehicle's suspension system. Although the freedom of movement is desirable, it presents some serious problems.

With certain levelers, if the vehicle prematurely pulls away, and in particular with a load on it, the support for the dock leveler is removed, and a free fall condition may be created. The entire deck may fall hitting the pit or the dock leveler frame, potentially causing injury to any fork truck operator on the deck, and secondarily damaging equipment and cargo. In addition to the damage from the impact, the fallen deck plate is left at a steep sloping angle creating a further potential hazard at the dock's edge.

Attendant to preventing free fall, manufacturers have devised numerous techniques for preventing this uncontrolled fall of a deck from premature departure. Different types of dock levelers offer different types of free fall protection.

Mechanical levelers typically use springs to raise the deck from the stored position to a preparatory position. A "holddown" device normally holds the leveler down against the upward bias of these springs, but may be released to raise the deck. Once the deck reaches the preparatory position, the lip is moved to its extended position, and a subsequent downward rotation of the deck will place the lip on the bed of the vehicle. With mechanical levelers, personnel must "walk down" the deck of the dock leveler to a position wherein the lip rests on the bed of the vehicle.

To limit free fall, mechanical levelers (as well as other levelers such as air operated levelers) use so-called 'safety legs,' i.e., legs that serve to stop the leveler from free falling beyond a certain position. Typically, the safety legs extend from the bottom of the deck and engage a fixed-height pedestal disposed in the pit or on the frame. Contact between the safety leg and the pedestal arrests any further downward movement of the deck. Thus, if a vehicle prematurely departs with a load on the deck, the deck will only "free fall" until the safety legs engage their pedestals. In a mechanical leveler application, if there is no load on the deck, the upward bias of the springs prevents downward movement of the deck. But if there is a load on the deck during premature departure, the weight of that load may cause the free fall of the deck.

There are various safety leg designs. And while these various designs offer different approaches and different advantages over one another, they are all incomplete. One limitation is that safety legs block the deck of a dock leveler from freely floating to below dock positions, with changes in vehicle bed height. If, for example, the weight of a fork truck forces the vehicle bed and deck downward, as occurs increasingly more frequently during loading and unloading of air ride suspension vehicles, the safety legs will engage the stopping pedestal and block the deck from further downward movement. If the vehicle bed moves further, e.g., as a result of the fork truck's weight entering the vehicle, then the lip engaging that bed will form a very steep angle from the bed to the deck. In essence, the deck will be suspended above the vehicle bed, by the length of the safety legs and pedestals, as the lip is acutely angled.

In this position, a fork truck may be forced to negotiate this steep slope during loading and unloading. As a result, the steep slope on the lip acts as a backstop or impediment to fork truck movement and, indeed, may prevent the fork truck from driving back onto the deck entirely. This condition, typically referred to in the industry as "stump out" is an inconvenience, and represents a potential safety hazard to the fork truck operator who does not notice the significant slope of the lip. Stump out can endanger dock personnel and damage the lip and lip hinge.

A number of different safety leg designs have been implemented to try and address stump out. Ultimately none have been successful. To allow the deck of the dock leveler to freely ride with the vehicle bed without being limited in downward movement, retractable safety legs have been designed. The legs are retracted rearwardly during normal dock leveler operation, including below-dock float of the deck. But once a free fall condition on the deck is detected, the legs are to be released from the retracted position and moved into place for engaging the pedestal. While such designs may function in theory, they fall short of performing that task completely and reliably.

Retractable safety leg attempt to balance two competing goals. They retract to allow free movement of the deck during normal operation; yet, they should also deploy fast enough to prevent complete free fall of the deck during premature departure of a vehicle. In theory, these safety leg designs should require a deployment mechanism that is faster than the deck's free fall. In practice, they do not. The various mechanical and other safety leg release mechanisms fail to prevent free fall in many situations, because either the mechanisms take too long to detect free fall or the safety legs take too long to release to prevent free fall.

In an attempt to skirt around this race to the bottom, i.e., where a safety leg must deploy in time to prevent complete free fall, some safety leg designs will allow a partially retracted leg to still engage a pedestal, for example, by placing multiple engaging stops (or stairs) on the pedestal. The safety leg can engage the stop nearest to it, even when in the retracted position. These and other similar designs attempt to lessen the deployment distance of the safety leg.

Still other designs attempt to trigger deployment before the vehicle has actually pulled away from the lip of the dock leveler. In U.S. Pat. No. 6,276,016 ("Safety Leg System For a Dock Leveler"), Springer described a system having a leg control member that will sense a vehicle prematurely pulling away from a dock and release a safety leg biased toward the deployed position, while a portion of the lip is still in contact with a vehicle bed. Thus, in theory, the release of the safety leg may happen before the vehicle has even moved completely away from the lip's edge. This design and other designs attempt to reduce the amount of time required between complete free fall and full deployment. Other designs sense lip fall, for example, by relying upon lip movement to trigger safety leg deployment.

Still other designs rely upon the speed of a deck's fall. One such design includes a safety leg attached to a roller, where under normal operating conditions, the roller rides along an engagement surface. When enough downward force is applied to the deck, for example, during free fall, the roller is retracted and the safety leg is exposed for engagement in a multiple-locking-position pedestal.

None of the these designs are satisfactory, because inevitably they all limit the extent to which a deck can travel below the dock position and still have protection against free fall. It would be advantageous to be able to provide a safety leg, or similar, system that does not suffer from the disadvantages of stump out and still allows for full range free float on the deck during normal operation.

DETAILED DESCRIPTION OF EXAMPLES

Numerous examples and techniques are described for addressing the problem of stump-out in dock leveler applications. In some examples, apparatuses are able to engage a dock leveler during operation to provide a continuously engaging sensor and stopping device. These apparatuses may avoid some of the problems with conventional safety leg applications and others, as the apparatuses are able to protect against free fall over a range of dock leveler operating positions, above and below dock level, and simultaneously avoid stump-out.

In some examples, a moveable pedestal may engage a dock leveler throughout a range of dock leveler operating positions. That engagement may be by biased contact, latching or the like. The pedestal may sense the beginning of free fall condition and prevent the dock leveler from continuing to free fall during a premature vehicle departure. The pedestal may float with the dock leveler as that leveler moves below or above dock level, thereby providing a continuously engaged free-fall condition sensor. Upon stopping a deck from a free fall, the pedestal may be easily reset to allow normal operation of the dock leveler, without moving the pedestal and without requiring disengagement of the pedestal from the dock leveler. The apparatus may sense any of a variety of measurable parameters to switch between a normal operating mode, wherein the dock leveler is allowed free movement, and a stopping mode, wherein the dock leveler is prevented from continued free fall. Velocity and flow rate are two example measurable parameters. Vehicle position is another. Although various apparatuses are described in certain example implementations, persons of ordinary skill in the art will know that these apparatuses may be used in other applications benefiting from the teachings herein.

Figure 1:
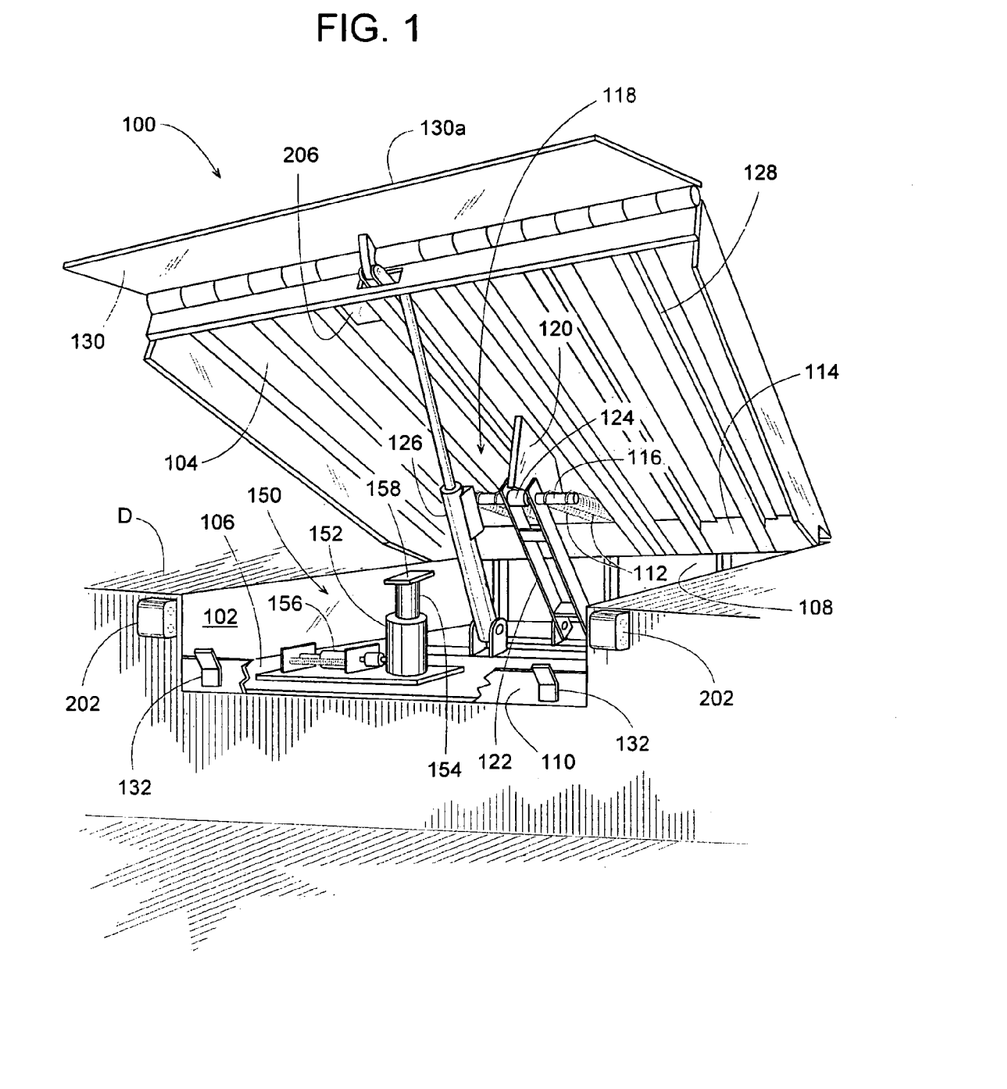
FIG. 1 is a perspective illustration of an example dock leveler having a stump-out apparatus.

FIG. 1 illustrates an example mechanical dock leveler 100 mounted in a pit 102 having a rearward section and a forward section. The dock leveler includes a deck 104 hingedly connected to a pit-mounted frame 106 having a back support 108 positioned at a rearward edge 109 and a front support 110 (partially shown) positioned at a forward-.edge 111. The leveler 100 is biased upward by a series of extension springs 112 mounted to a back plate 114 of the deck 104 at one end and mounted to a cross bar 116 at an opposite end. The springs 112 and cross bar 116 form part of a deck lift 118 that also includes a camming plate 120 mounted on the underside of the deck 104 and a pivotal arm 122 pivotally connected to the back support 108 of the frame 106. The cross bar 116 is threaded through the arm 122 and a roller 124, which is positioned to ride along the cam surface formed by the plate 120. In operation, the springs 108 bias the cross bar 116 upward against the plate 120 initially erecting the dock leveler 100 and otherwise biasing the dock leveler 100 to an above dock position. With the deck lift apparatus 118, the dock leveler 100 is a "walkdown"-type dock leveler, requiring that an operator apply a downward force on the deck 104 to move it from the position shown to a dock position, wherein the deck 104 is flush with the dock floor, D, or another desired operating position.

The deck lift 118 includes a ratchet and pawl mechanism 126 that retains the dock leveler 100 in the operative position after the dock leveler 100 has been walked down. Persons of ordinary skill in the art will know of suitable ratchet and pawl mechanisms. By way of example, such mechanisms that prevent a dock leveler from fully erecting under the biasing force of the extension springs but nonetheless allow for deck float during normal operation are described in U.S. Pat. No. 4,531,248.

The dock leveler 100 is shown by way of example only. Any mechanical leveler may be used instead. Alternatively, an air-actuated leveler or other electromechanically actuated leveler may be used.

The deck 104 includes a series of longitudinally extending support beams 128. A lip 130 is hingedly connected to a forward edge of the deck 104. In the illustrated example, when the deck 104 is not in use, it will overlie and close off the open top of the pit 102 and be substantially flush with the dock floor, D. The deck 104 is supported in this position by the lip 130 assuming a dependent position and the free edge 130a of the lip engaging a pair of horizontally spaced keepers 132 projecting from the front support 110.

To effectively prevent free fall while simultaneously preventing stump-out, an apparatus 150 is positioned at the forward edge of the pit 102, mounted to the inside of the front support 110. The apparatus 150 and the various other similar apparatuses illustrated and/or described herein are collectively termed stump-out apparatuses. The apparatus 150 may be part of an existing dock leveler or retrofitted into an existing dock leveler, including mechanical and electro-mechanical dock levelers.

As explained in further detail below, the apparatus 150 includes a vertically-oriented fluid chamber apparatus, which in the illustrated example is a main fluid cylinder 152 having a piston 154. A second fluid chamber apparatus, depicted in the illustrated example as an accumulation fluid cylinder 156, is coupled to the main cylinder 150 for receiving and exchanging fluid, e.g., oil or air. To provide a low profile device in some examples, the accumulation cylinder 156 may be horizontally oriented, as illustrated. When a downward force is applied to a header plate 158 of the piston 154, for example, under the weight of a fork truck on the deck 104, vertically-stored fluid of the main cylinder 150 is transferred to the accumulation cylinder 156. The horizontal orientation of cylinder 156 allows the piston 154 and cylinder 152 to have a low vertical profile that, in turn, allows the deck 104 to have a full range of free float operation. The position of the chamber apparatus 156 may be different from that shown, however, as the chamber apparatus 156 may be located in any position with a horizontal plane. Alternatively, the second chamber apparatus 156 may be vertically-oriented or tilted (with respect to a vertical or horizontal plane).

As explained in further detail below, the header plate 158 may be considered a floating sensor (or floating pedestal) that provides a continuously contacting sensing surface over a desired range of movement of the dock leveler 100, including below dock and above dock positions.

Figure 2:
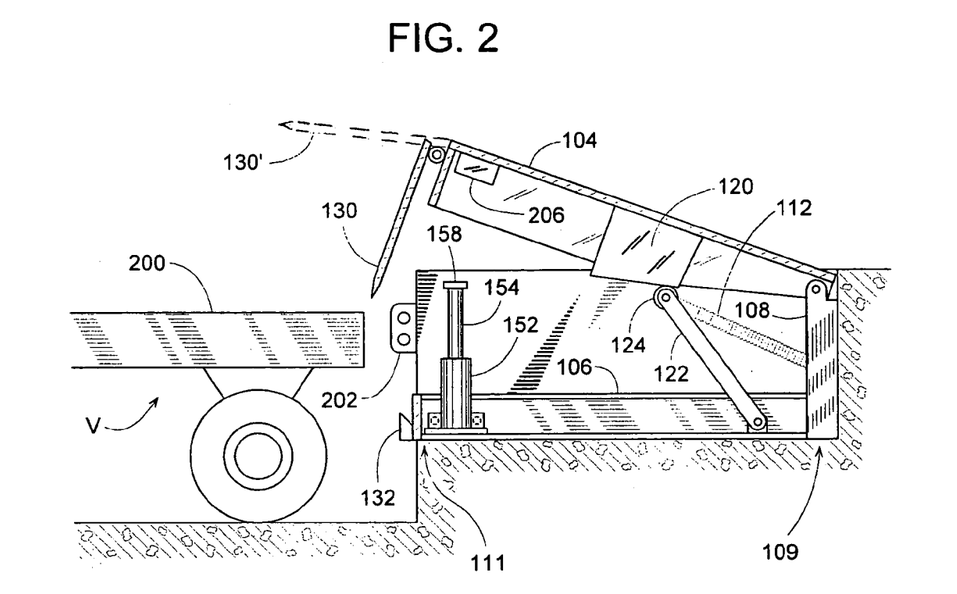
FIG. 2 illustrates a cross-sectional view of the dock leveler of FIG. 1 in a raised positioned.
Figure 3:
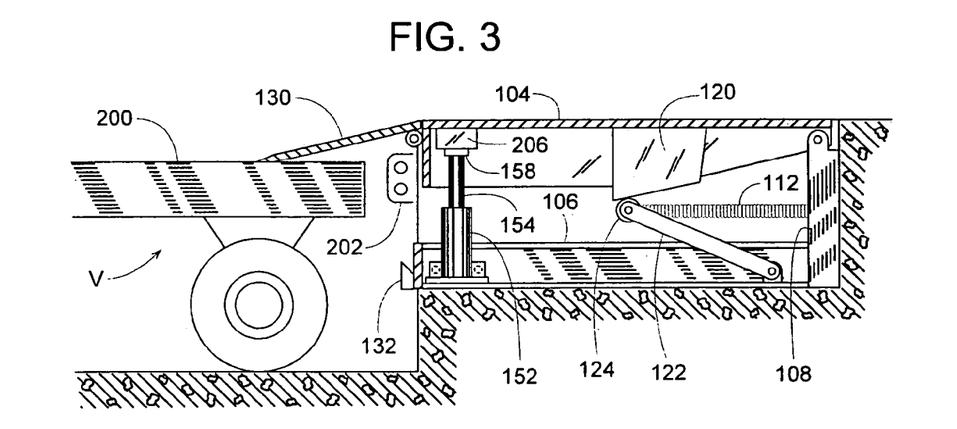
FIG. 3 is similar to FIG. 2 except with the dock leveler in a dock level position and with a lip engaging a vehicle bed.
Figure 4:
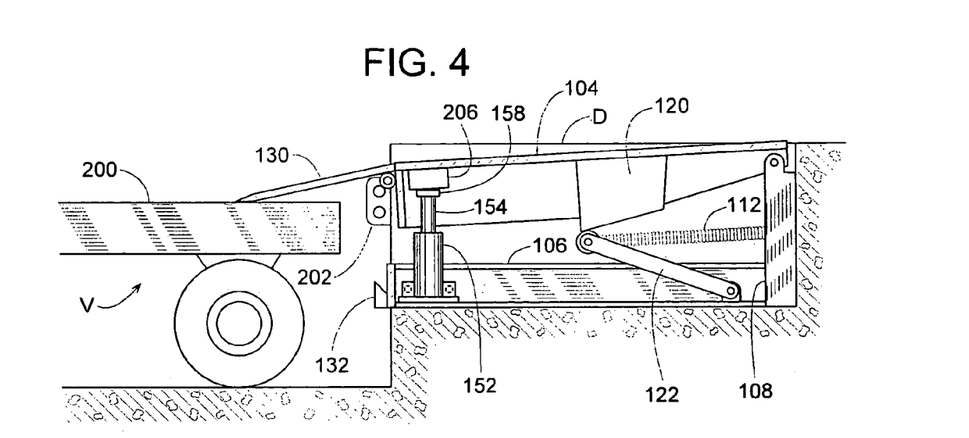
FIG. 4 is similar to FIG. 3 except with the dock leveler in a below dock position.

FIGS. 2–4 show various positions of the stump-out apparatus 150 during normal dock leveler operation, wherein the deck 104 is freely movable above and below a dock-level position. For explanation purposes, some details of the dock leveler 100, which are shown in FIG. 1, are not shown in FIGS. 2–5. FIG. 2 shows the dock leveler 100 in a raised position, after the springs 112 have raised the leveler. While the deck 104 is rising, the lip 130 may be extended through known means. The lip 130 is illustrated in the pendant position (130) and in the extended position (130') from which the lip may engage a bed 200 of a vehicle, V. FIG. 3 illustrates the apparatus 100 in a dock-level position with the lip 130 engaging the vehicle bed 200 after the vehicle V has been positioned adjacent a dock mounted bumper 202. To sense any free fall condition in the deck 104, from the dock-level position in the illustrated example, an engagement block 204 mounted on the under surface of the deck 104 engages the header plate 158. Alternatively, the header plate 158 may contact any portion of the deck 104, the support beams 128, or other structure. In fact, although the apparatus 150 is shown centered along the forward edge 111, one or more of the apparatus 150 may be used and positioned elsewhere, for example, along the sides of the forward edge 111. Additionally, the size of the block 204 is shown by way of example and typically would be sufficient to allow the deck 104 to move freely to its lowest most position without being impeded from such movement by the apparatus 150, during normal operation.

Figure 5:
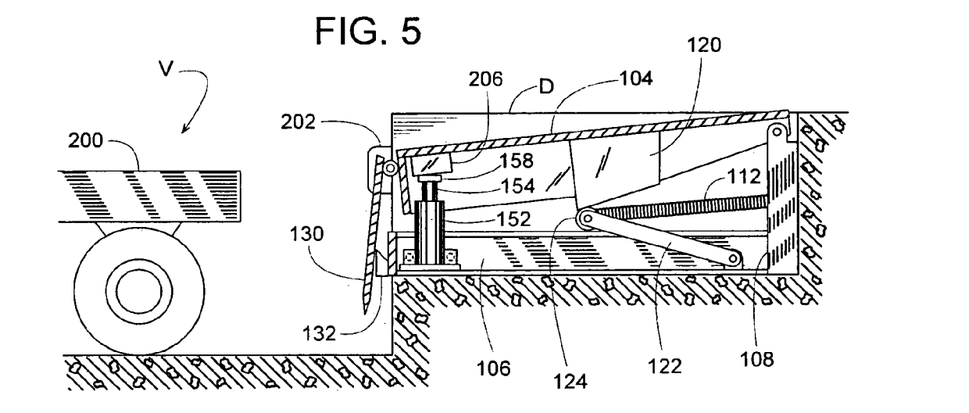
FIG. 5 is similar to FIG. 4 except with the vehicle having prematurely departed and the stump-out apparatus preventing free fall of the dock leveler.

FIG. 4 illustrates the apparatus of FIGS. 2 and 3, except with the vehicle bed 200 below the dock-level position, as might occur when the vehicle suspension responds to the presence of a fork truck during a loading. FIG. 5 illustrates the same apparatus after the vehicle V has prematurely pulled away from dock face, thereby removing support for the lip 130 and exposing the dock leveler 100 to a free fall condition. The weight of a fork truck or cargo stored on the deck 104 may apply a substantial downward force on the header plate 158, thus indicating a free fall condition. Instead of transferring that vertical force into a fluid displacement, the apparatus 150 may stop the downward movement of the header plate 158 and piston 154 entirely.

FIGS. 2–5 illustrate the header plate 158 being freely engageable and disengageable with the undersurface of the deck 104.

Figures 6A, 6C:
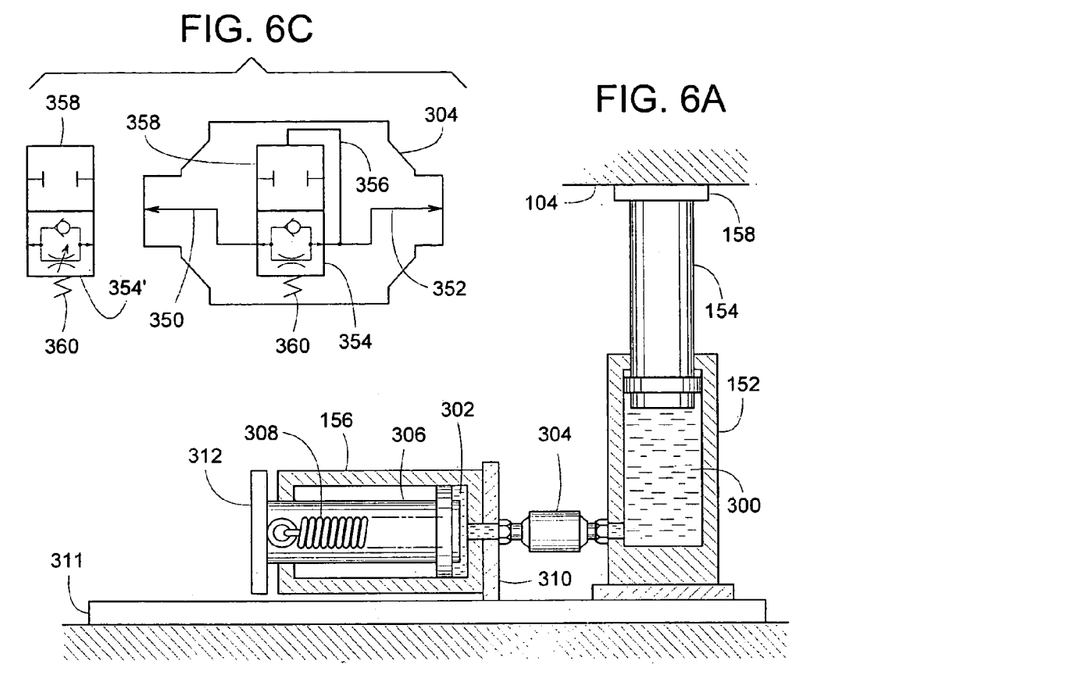
FIGS. 6A and 6B illustrate a cross-sectional view (looking into a dock pit) of an example stump-out apparatus in an extended and retracted position, respectively.
FIG. 6C illustrates a detailed view of an example flow control device that may be used in the apparatus of FIGS. 6A and 6B.
Figure 6B:
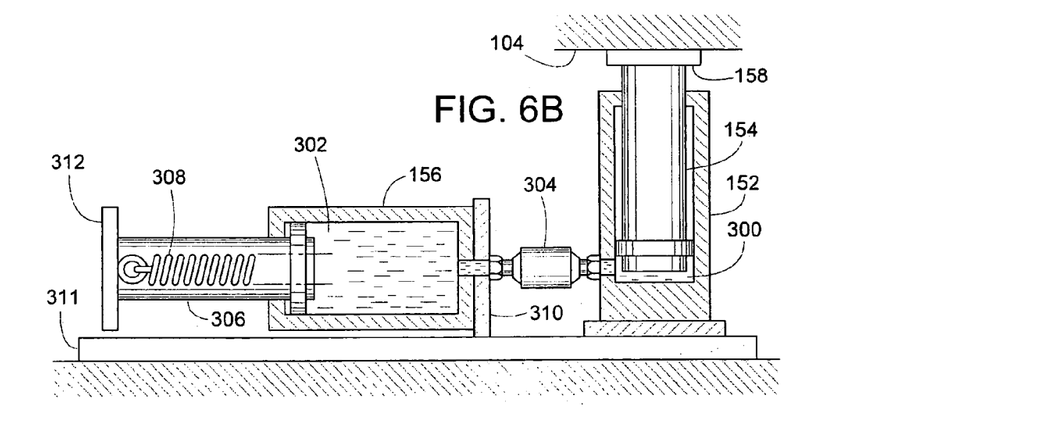

To allow for floating movement of the header plate 158, and thus provide a floating sensor and continuous stopping pedestal, the apparatus 150 includes two coupled fluid chambers, 300 and 302, that form a closed loop reciprocating fluid exchange system. FIGS. 6A and 6B show a front view of the stump-out apparatus 150 in an extended position and a retracted position, respectively, where these terms refer to the position of the piston 154 and header 158. The main cylinder 152 houses the fluid chamber 300, such that under a certain downward force on the header plate 158, the vertically moving piston 154 moves fluid from the main cylinder 152 through a velocity fuse 304, in a controlled fluid flow direction, into the chamber 302 of the accumulation cylinder 156. The result is a horizontal force that extends a piston 306 in a horizontal direction. Thus, in the illustrated example, the downward force on the deck is converted to a horizontal force, which is stored for re-extending the piston 154. In alternative configurations, that downward force may result in a vertical, partially vertical, or angled force affecting an accumulation cylinder, bladder, piston, or other storage device capable of reciprocal force transfer back-and-forth with the main chamber apparatus 152.

To store the horizontal force and bias the apparatus 150 into a main-piston extended position, two extension springs 308 (see also FIGS. 7A and 7B) are attached to a stationary mounting bracket 310 and a header plate 312 on the piston 306. The bracket 310 may be rigidly attached or integrally formed with a support plate 311. In the illustrated examples, the springs 308 may apply a left-to-right horizontal force that counters the right-to-left horizontal force that results from the vertical downward force on the header 158 (e.g., the retracted position of FIG. 6B). As a result, when this vertical downward force is decreased or removed, the springs 308 will retract the header 312 forcing fluid from the accumulation chamber 302 back into the chamber 300, in a free flow direction. In this way, the springs 308 may bias the header 158 upward. This configuration also allows the header plate 158 to float down and up in continuous engaging contact with the dock leveler 100 over a range of operation.

In the illustrated example of FIGS. 6A and 6B, the springs 308 may allow for a reciprocating relationship between the cylinder 152 and the cylinder 156, due to the biasing of fluid from the former to the latter. Also, in this configuration the fluid is part of a closed loop system that is not exposed to other systems or the environment. Persons of ordinary skill in the art will appreciate other techniques and mechanism for achieving reciprocal fluid transfer.

To sense a free fall condition, the velocity fuse 304 is positioned between two fluid chambers 300 and 302 and acts as a flow sensor that is able to stop fluid transfer when the flow rate from chamber 300 to chamber 302 is too great. FIG. 6B may represent the position of the apparatus 150 in the condition illustrated in FIG. 5, that is, when a vehicle has prematurely departed and the apparatus 150 has prevented free fall. The header 158 may sense the deck at below or above dock positions. For example, to have selective engagement above the dock level position, a deeper pit may be used to allow for a taller piston. Alternatively, or additionally, a telescoping piston may be used in place of piston 154 to allow the header 158 to sense across a greater range of operating positions of a dock leveler.

Once the vehicle V prematurely pulls away, the deck 104 may begin to fall rapidly, e.g., with a load on the deck 104, causing a substantial downward force on the header 158. This condition increases the fluid flow rate from the main cylinder 152 into the accumulation cylinder 156. The rate of the fluid flow is independent of the height of the header 158 above the cylinder 152. The velocity fuse 304 allows controlled fluid transfer from the main cylinder 152 to the accumulation cylinder 156, so long as that fluid flow rate is below a certain value. As the flow rate exceeds this certain value, the pressure build up closes the velocity fuse 304 and prevents the velocity fuse 304 from passing any more fluid. This blocks all fluid flow and prevents the piston 152 from depressing any further into the chamber 300.

FIG. 6C shows a detailed diagram of an example implementation of the velocity fuse 304. As illustrated, the velocity fuse 304 acts as a check valve that allows controlled fluid flow in a first direction 350 and free fluid flow in a reverse direction 352. A first flow element 354 maintains this condition. A pilot line 356 is connected to the first flow element 354 and a second flow element 358 that operates to fully or substantially block flow in both directions 350 and 352. Once the element 354 experiences a high enough flow rate, the increased pressure in line 356 switches the second element 358 into the position of the first element 354 shown, creating a lock-up condition. Such switching occurs against a spring 360 that biases the element 354 into the position shown. FIG. 6C also shows a first element 354' that may be used in place of the element 354 to form an adjustable velocity fuse, wherein the flow rate that triggers switching between normal and stopping mode is mechanically adjustable.

Figure 7A:
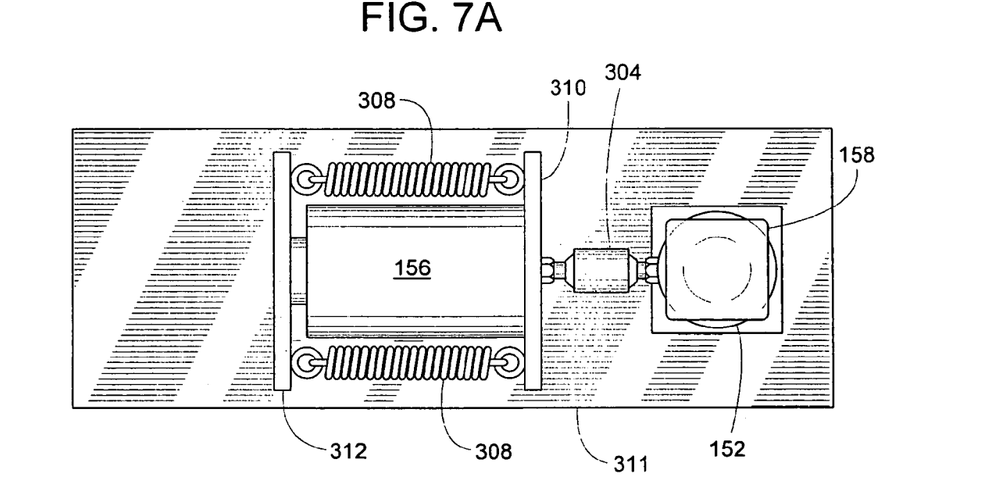
FIGS. 7A and 7B illustrate top views of the stump-out apparatus as shown in FIGS. 6A and 6B, respectively.
Figure 7B:
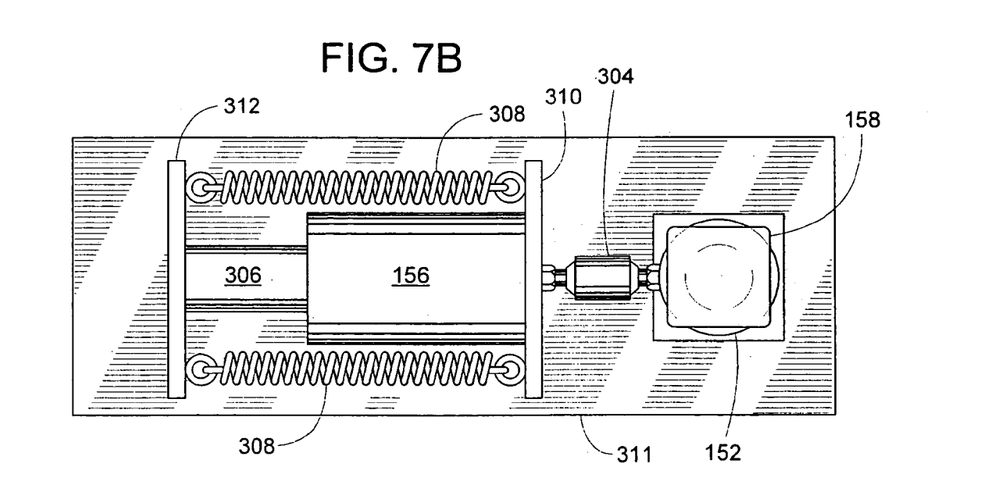

FIG. 7A shows a top view of the apparatus 150 in an extended position for the piston 154 (coming out of the page), with the piston 306 fully retracted under the force of the springs 308. FIG. 7B shows a similar perspective except with the apparatus 150 in an extended position with the piston 152 depressed and the piston 306 extended out of the accumulation cylinder 156. FIG. 7B may represent, for example, a stopping condition for the apparatus 150 wherein the velocity fuse 304 has sensed a free fall condition, and prevented further downward movement of the piston 152.

To reset the apparatus 150 from this stopping mode to a normal operating mode, the springs 308 may have a high enough spring force to reset the velocity fuse 304. In a mechanical leveler and others, any substantial load on the deck plate 104 may need to be removed before resetting though. Alternatively to spring resetting, an operator may apply a return force to the header 312 in a direction toward to the accumulation cylinder 156. Alternatively still, a pull chain or latch may be coupled from the header plate 158 to the deck plate 104, such that raising the deck plate 104 creates suction within the main chamber 300 to reset the fuse 304. These forces may be used to bias the header upward as well.

The velocity fuse 304 responds to flow rate, which is proportional to the velocity of the downward movement of the deck 104. The triggering flow rate, whereby the velocity fuse 304 switches from a normal mode to a stopping mode, should be sized so as not to trigger during normal operation, avoiding "nuisance lock-up." This is by way of example, however, as persons of ordinary skill in the art will recognize other devices and techniques for adjusting the sensed flow rate, or velocity, of the apparatus 150, such as that shown in FIG. 6C. Additionally, as described below, other measurable parameters may be sensed in addition to or in lieu of flow velocity.

Figure 8A:
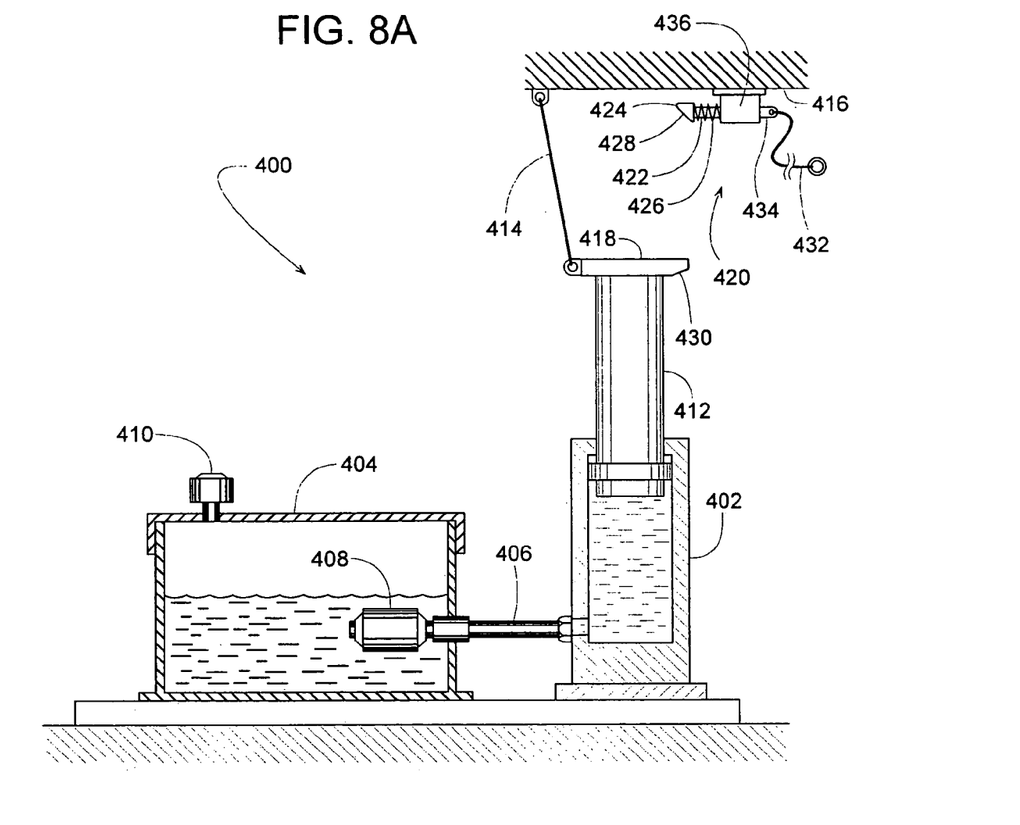
FIG. 8A illustrates a cross-sectional view of another example stump-out apparatus in a fully extended position, respectively.
Figure 8B:
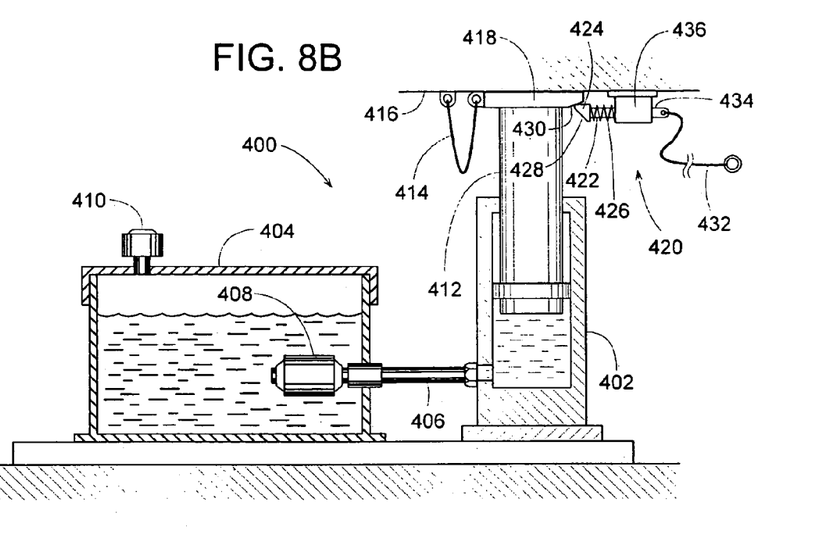
FIG. 8B is a similar illustration to FIG. 8A, except with the stump-out apparatus in a retracted position and engaged with a latch.
Figure 8C:
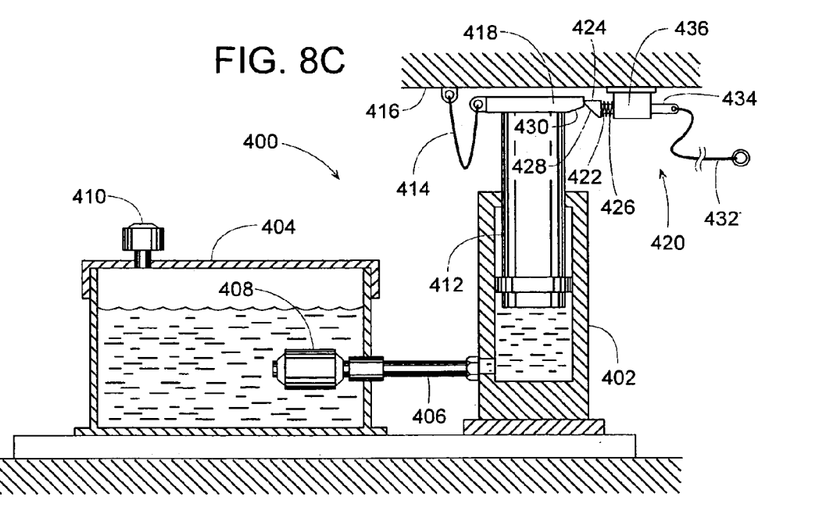
FIG. 8C is a similar illustration to FIG. 8B, except with the stump-out apparatus disengaging from the latch.

Numerous alternatives may be achieved. FIGS. 8A–8C illustrate an alternative stump-out apparatus 400 including a first fluid chamber apparatus, e.g., a main cylinder 402, a second fluid chamber apparatus, e.g., an accumulation reservoir 404, and a pipe 406 connecting the two. The accumulation reservoir 404 includes a velocity fuse 408 that passes fluid between the main cylinder 402 and the accumulation reservoir 404 during normal operation. The change in volume of air above the fluid level in the accumulation reservoir 404 is vented and replenished through a breather 410. In the illustrated example, a pull chain 414 is connected to the undersurface of a deck 416 and to a header 418, such that raising the deck may pull the piston 412, siphoning fluid through the velocity fuse 408, and resetting the velocity fuse 408 to a normal operating condition. Alternatively, the chain 414 may extend through the deck 416 to allow an operator to manually pull on the chain 414. The pull chain 414 is optional, however.

Freely engageable and disengageable header and deck configurations are described above. Alternative engagements are also contemplated. A header plate may be couplably engaged with the under surface of a deck, for example, via a latch extending from the deck. The latch may then release the header plate after the deck has continued to rise above an extended-most position of the header. Other fasteners are contemplated, including a ball and detent coupler, as well as Velcro-based or button fasteners. And, as described herein, the header may be coupled to a deck via a tie, linkage, or chain. In some configurations, as a result of these couplings, the upward movement of a deck may be able to apply an upward force on a header. This upward force may be used during normal operation mode to maintain close proximity between the header and the deck to avoid a separation that could create an undesirable free fall condition, and it may be used to reset the apparatus 150 after a lock-up in the stopping mode. An example of a latch configuration is shown in FIGS. 8A–8C.

FIG. 8B shows the apparatus 400 with the header plate 418 engaging the under surface 416 after the deck 416 has applied a downward force on the header plate 418. The header plate 418 is couplably engageable with the deck 416 via an optional releasable latch 420, which in the illustrated example may be used to bias the header 418 upward and to reset the velocity fuse 408. The latch 420 includes a translating arm 422 having a nose 424 biased to an extended position via a spring 426, for example a compression spring. To initially engage the latch 420 with the header 418, the nose 424 includes a guide surface 428 that is articulated to ride along the header 418. Similarly, to disengage the latch 420 from the header 418, the header 418 includes a guide surface 430.

Persons of ordinary skill in the art will appreciate that the nose and header configuration illustrated is by way of example only. For example, the guide surface 430 could be alternatively incorporated on the nose 424 opposite surface 428. Alternatively, the header and nose could have complimentary sloped side surfaces engaging one another. Other examples will be apparent.

During operation, the latch 420 may automatically engage the header 418 when the deck 416 makes initial contact with the header 418. The latch 420 may manually disengage the header 418 at any dock position, via a pull chain 432 tied to a leveler arm 434. The pull chain 432 may extend through a slot in the deck 416, for example. A guide mechanism 436 keeps the nose 424 and arm 422 is a current position. Pulling on the pull chain 432 retracts the nose 424 thereby disengaging the latch 420 from the header 418. Additionally, or alternatively, raising the deck 416 beyond the extended most position of the header 418 will cause the nose 424 to ride along the guide 430. As the deck 416 continues to rise, the nose 424 automatically disengages from the header 418. FIG. 8C shows an example of such disengagement. Persons of ordinary skill in the art will appreciate that the latch 420 is shown by way of example. Other selective coupling mechanisms or techniques may be used, some of which are listed herein.

Figure 9A:
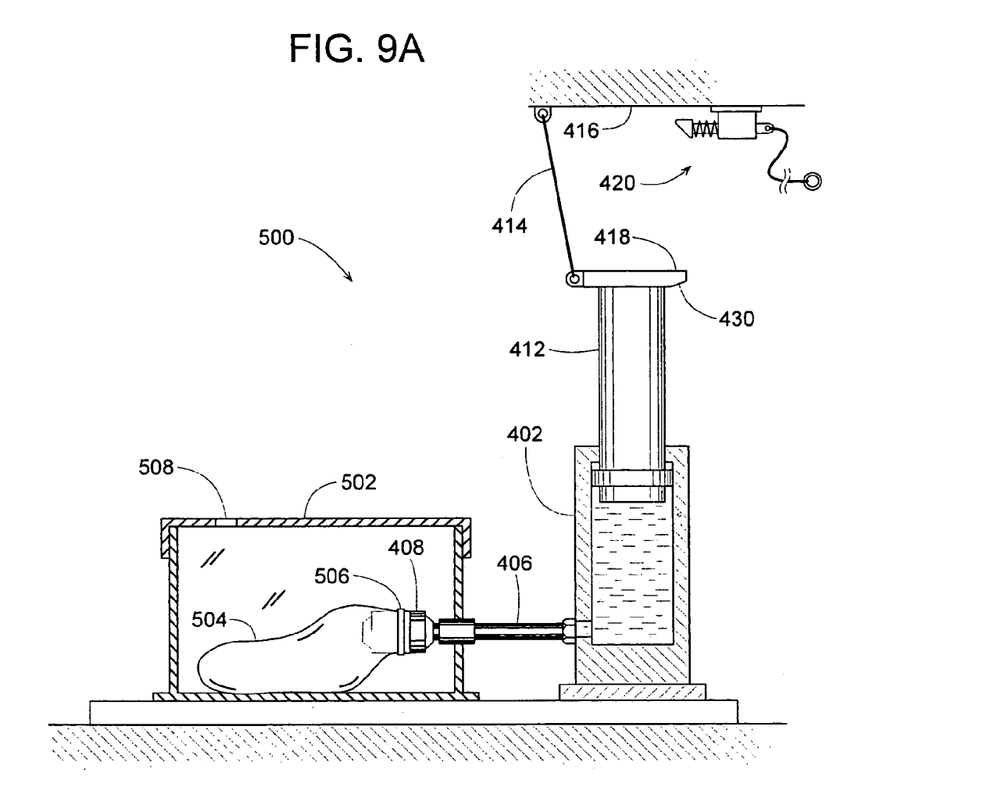
FIGS. 9A and 9B illustrate cross-sectional views of yet another example stump-out apparatus in a fully extended and a retracted position, respectively.
Figure 9B:
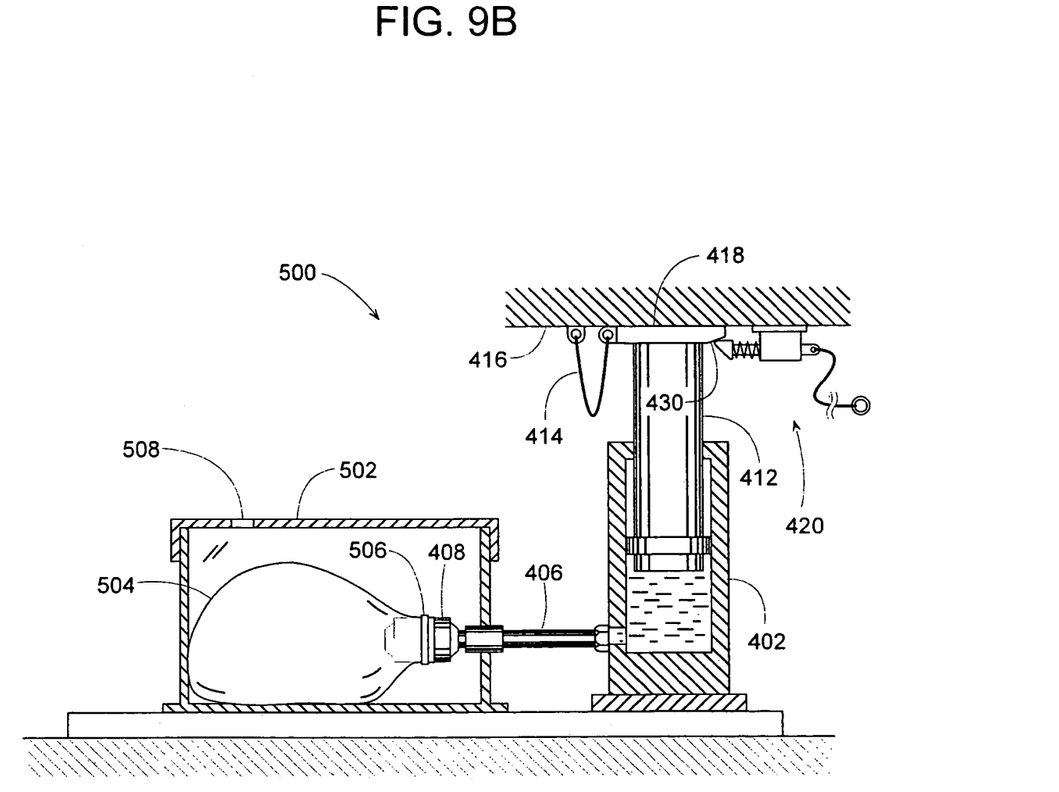

FIGS. 9A and 9B illustrate another example apparatus 500 having a similar main cylinder to that of apparatus 400, and thus bearing like reference numerals. The main cylinder 402 of FIG. 9A is coupled to a suitable fluid housing 502 through the pipe 406. In place of a reservoir and breather, the housing 502 includes a resilient fluid bladder 504 that increases in volume as fluid is transferred from the main cylinder 402 to the housing 502. In the illustrated example, the bladder 504 is attached via a collar 506 around the velocity fuse 408. The housing 502 is shown with an optional vent 508.

FIG. 9B illustrates the apparatus 500 after a downward force has caused fluid from the main cylinder to fill the bladder 504. The pull chain 414 and/or the latch 40 may be used to reset the velocity fuse 408 and put the apparatus 500 back into a normal operating mode from a stopping mode, for example, via lifting the deck plate 416. The length of the pull chain 414 may be set to a sufficient distance to allow the deck 416 to raise high enough to allow proper lip flip-out.

The pull chain 414 may be replaced with another type of flexile linkage, a rigid linkage, an extension spring, or a combination of elements. In another alternative, the header 418 may be releasably coupled to the deck 416, via a fastener, ball detent connection, or the latch 420. With such devices, the header 418 and the deck 416 may maintain a first condition (e.g., coupled) during resetting to fully extend the piston 412, but have a second condition (e.g., uncoupled) to allow the deck to continue rise above the fully extended piston, for lip flip out.

Figure 10:
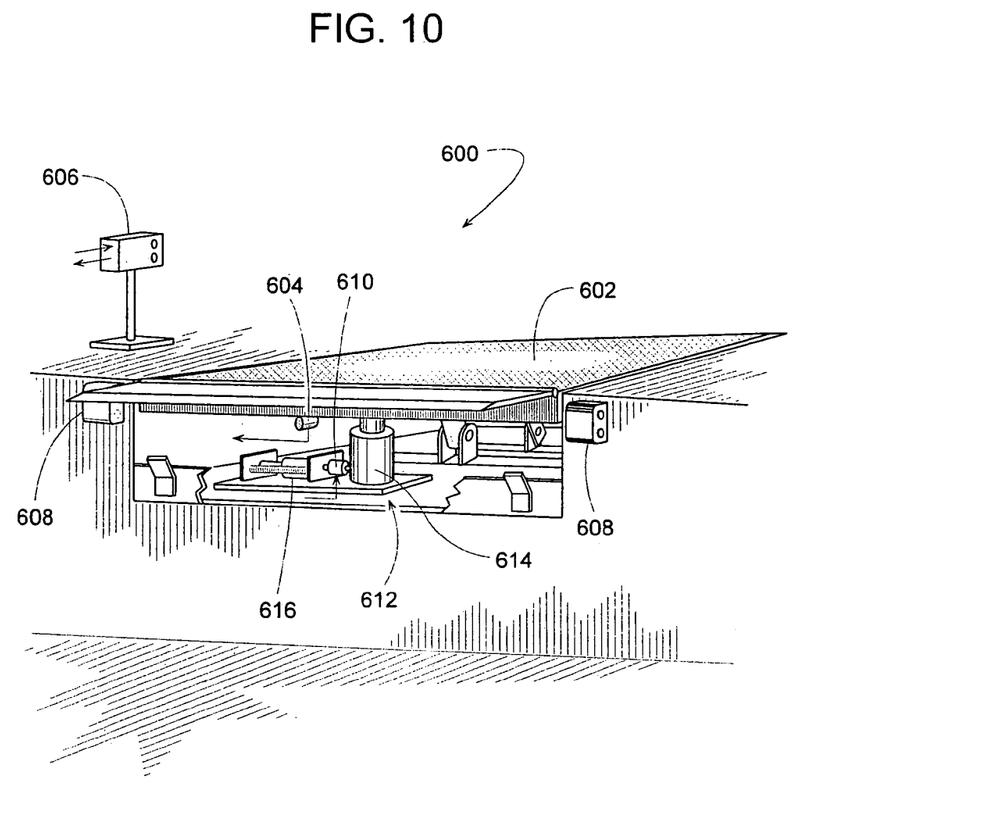
FIG. 10 illustrates a dock leveler application having an electronic sensor that controls a stump-out apparatus.

In the above examples, an apparatus detects free fall of a deck plate. In other examples, an apparatus may detect premature departure of a vehicle by sensing changes in vehicle position. FIG. 10 illustrates an example dock leveler 600 wherein a deck 602 includes a position sensor 604 at a forward edge thereof. The position sensor 604 may be an electronic sensor, such as an ultrasonic sensor, infrared sensor, or laser photo-eye detector system coupled to a controller, which in the illustrated example is housed in a control box 606. The sensor 604 may be calibrated to detect the position of a vehicle under the control of the controller, for example, by having the sensor 604 measure and log a vehicle's initial distance when the vehicle is parked near the dock, e.g., near bumpers 608. The sensor 604 may then continuously measure the position of the vehicle relative to that initial distance. The controller may be programmed to determine when the vehicle has moved away from the initial distance a certain amount and then signal an electrically controlled valve 610, for example, a solenoid valve, in stump-out apparatus 612. The valve 610 may operate similarly to the velocity fuses described above and prevent fluid flow from a main cylinder 614 to an accumulation cylinder 616 via signaling from the senor 604 that indicates a premature departure condition, prior to the deck losing support by the vehicle, is occurring. The sensor 604 may preempt a free fall condition all together, however, without use of a velocity fuse.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What we claim is:

1. For use in a dock leveler having a deck pivotally coupled to a frame and moveable over an operational range, an apparatus comprising:
   a first fluid chamber apparatus, mounted substantially vertically and adapted to selectively engage the deck within the operational range, the first fluid chamber apparatus having an extended position and a retracted position below the extended position;
   a second fluid chamber apparatus coupled to the first fluid chamber apparatus to communicate fluid with the first fluid chamber apparatus;
   a biasing apparatus adapted to bias the first fluid chamber apparatus to the extended position; and
   a flow control valve coupling the first fluid chamber apparatus to the second fluid chamber apparatus and having a normal mode wherein the deck is moveable throughout the operational range and a stopping mode wherein the downward movement of the deck is prevented within the operational range in response to a measured parameter.

2. The apparatus of claim 1, wherein the operational range extends above and below a dock level position for engagement of vehicles of different bed heights.

3. The apparatus of claim 2, wherein the deck is moveable above the operational range, and wherein the first fluid chamber apparatus disengages the deck when the deck is above the operational range.

4. The apparatus of claim 1, wherein the flow control valve is a velocity fuse and the measured parameter is a flow rate of fluid transfer from the first fluid chamber apparatus to the second fluid chamber apparatus.

5. The apparatus of claim 4, wherein under the normal mode the velocity fuse allows controlled flow in a first direction and free flow in a second direction and under the stopping mode prevents flow.

6. The apparatus of claim 1, wherein the flow control valve is an electrically controlled valve.

7. The apparatus of claim 6, wherein the electrically controlled valve is a solenoid valve.

8. The apparatus of claim 1, wherein the first fluid chamber apparatus comprises a first header moveable from the extended position to the retracted position in response to downward movement of the deck.

9. The apparatus of claim 8, wherein the second fluid chamber apparatus comprises a second header moveable in response to downward movement of the first header.

10. The apparatus of claim 9, further comprising a spring apparatus coupled to bias the first header to the extended position.

11. The apparatus of claim 10, wherein the spring apparatus comprises an extension spring coupled between the second header and a fixed support.

12. The apparatus of claim 1, wherein the biasing apparatus is a spring apparatus.

13. The apparatus of claim 1, wherein the biasing apparatus includes a resilient member or a latching apparatus.

14. The apparatus of claim 1, wherein the first fluid chamber apparatus is a first hydraulic cylinder and wherein the second fluid chamber apparatus is a second hydraulic cylinder.

15. The apparatus of claim 1, further comprising a reset apparatus coupled to the flow control valve to selectively switch the flow control valve from the stopping mode to the normal mode.

16. The apparatus of claim 15, wherein the reset apparatus comprises a pull chain coupled to a header of the first fluid chamber apparatus.

17. The apparatus of claim 15, wherein the reset apparatus is a latching apparatus.

18. The apparatus of claim 15, wherein the reset apparatus is a spring apparatus.

19. The apparatus of claim 15, wherein the reset apparatus is a solenoid valve.

20. The apparatus of claim 1, wherein the measured parameter is vehicle location.

21. The apparatus of claim 20, further comprising a position sensor disposed to measure the vehicle location.

22. The apparatus of claim 1, wherein the second fluid chamber apparatus comprises a fluid reservoir and a breather.

23. The apparatus of claim 1, wherein the second fluid chamber apparatus comprises a resilient bladder.

24. The apparatus of claim 1, wherein the second fluid chamber apparatus is oriented at an angle to the first fluid chamber apparatus.

25. The apparatus of claim 1, wherein the first fluid chamber apparatus and the second fluid chamber apparatus form a closed loop system.

26. The apparatus of claim 1, further comprising a latching apparatus disposed to selectively couple the deck and the first fluid apparatus.

* * * * *